United States Patent [19]
Nickerson et al.

[11] 3,887,461
[45] June 3, 1975

[54] MAKING ACTIVE CARBON FROM SEWAGE SLUDGE

[75] Inventors: Robert D. Nickerson, Riverside, Conn.; Henry Cashel Messman, Larchmont, N.Y.

[73] Assignee: Combustion Engineering, Inc., Windsor, Conn.

[22] Filed: Apr. 16, 1973

[21] Appl. No.: 351,685

Related U.S. Application Data
[63] Continuation-in-part of Ser. No. 141,896, May 10, 1971, abandoned.

[52] U.S. Cl. .............. 210/39; 201/2.5; 201/25; 201/31; 201/36; 210/71; 252/421; 252/425; 423/449
[51] Int. Cl. ............................................ G02c 3/00
[58] Field of Search .................. 252/421–425, 252/445; 201/25, 2.5; 210/40, 5.6, 62, 71, 18, 28, 32, 39, 10; 423/445, 449

[56] References Cited
UNITED STATES PATENTS
| | | | |
|---|---|---|---|
| 3,275,547 | 9/1966 | Bucksteeg et al. | 201/25 |
| 3,455,820 | 7/1969 | Joyce et al. | 210/40 |
| 3,541,025 | 11/1970 | Oda et al. | 252/421 |
| 3,619,420 | 11/1971 | Kemmer | 252/422 |
| 3,637,487 | 1/1972 | Kemmer et al. | 252/423 |
| 3,640,820 | 2/1972 | Kemmer et al. | 252/422 |
| 3,714,038 | 1/1973 | Marsh | 210/71 |

FOREIGN PATENTS OR APPLICATIONS
| | | | |
|---|---|---|---|
| 213,940 | 5/1924 | United Kingdom | 252/417 |

Primary Examiner—Patrick P. Garvin
Assistant Examiner—P. E. Konopka
Attorney, Agent, or Firm—Robert L. Olson

[57] ABSTRACT

The process of removing solids from sewage, subjecting these solids to pyrolysis, thereby producing active carbon and char, and using both of these materials as adsorbent agents in the treatment of the sewage or other waste water.

4 Claims, 1 Drawing Figure

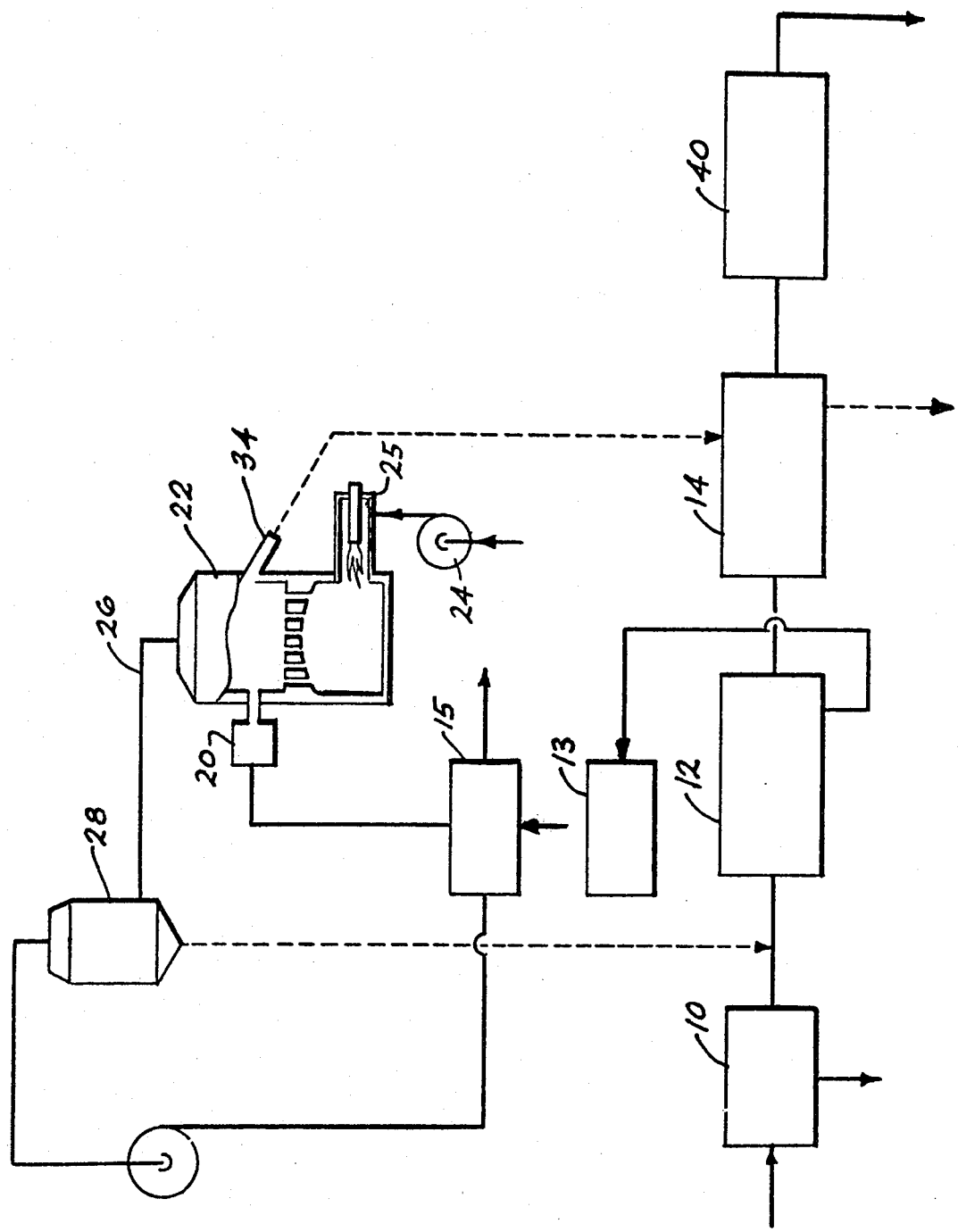

MAKING ACTIVE CARBON FROM SEWAGE SLUDGE

This is a continuation in part of application Ser. No. 141,896, filed May 10, 1971, now abandoned.

BACKGROUND OF THE INVENTION

Because of increasing concern over water and land pollution, efficient and economical methods of disposing of sewage are being sought. Various materials have been used in sewage treatment in the past in order to remove impurities from the sewage water so that it can be disposed of without endangering wildlife or humans. Two such materials are powdered and granular carbon which have proved to be effective adsorbent agents in the treatment of sewage. Use of activated carbon or char in the treatment of sewage has never gained widespread commercial application because of the prohibitive costs of these materials.

SUMMARY OF THE INVENTION

In accordance with the invention, the solids are removed from sewage, subjected to pyrolysis in a fluidized bed at temperatures within the range of 500°C–1000°C to produce active carbon and char. These materials are then used as adsorbent agents in the treatment of the sewage or other waste water.

BRIEF DESCRIPTION OF THE DRAWING

The accompanying drawing is a flow sheet of a sewage treatment system incorporating the invention.

DESCRIPTION OF THE PREFERRED EMBODIMENT

Looking now to the drawing, 10 is a chamber for incoming raw sewage, where floating material is screened out, and heavy inert solids are settled out, and additives may be added to the sewage. The sewage then progresses to the settling tank 12, where some of the additives along with the absorbed matter and other solids are allowed to settle out of the sewage water to form a bottom sludge. The sewage water moves on to a subsequent treatment tank 14, where it can be treated with further additives, and further settling occurs.

From tank 12, the sludge flows to mechanical dewatering device 13, where it is substantially dewatered by vacuum filtration or other means. Filtrate water from 13, taken together with weir overflow from the settling tank 12, is commonly said to have had primary treatment and, as such, is often discharged from a sewage treatment plant, even though it is still highly polluted, except where a substantial amount of active carbon has been used in the primary system, as provided by this teaching.

The solids which are filtered out of the sewage in the form of cake, are conveyed to a dryer 15, where they are at least partially dried by hot gases. A screw feeder 20 introduces the sludge cake into a fluidized bed reactor 22, where it is flash heated and carbonized and where it simultaneously disintegrates into small particles, most of which will pass through 16 mesh (U.S. Standard Sieve) and some of which will pass through 325 mesh. Hot flue gas is supplied to the reactor by means of blower 24 and the velocity of the gas flowing through the reactor is sufficient to maintain the carbonizing sludge particles in a fluidized state. Any suitable fuel can be combusted in burner 25. The temperature within the reactor is held within the range of 500°C–1000°C, and the gas contains little free oxygen, so that the sludge is subjected to pyrolysis.

The only oxygen contained in the combustion gases is the excess air supplied to burner 25 in order to maintain optimum combustion within this burner (optimum combustion being accomplished with a slight excess of air). Thus the amount of free oxygen contained in the combustion gases flowing through the reactor would be within the range of .1–2 percent by volume. Surprisingly, the sludge particles, after having their residual moisture flashed off and most of their pyrolitic volatile products driven off, are in the form of active carbon and char, which does not require further conventional activation (selective oxidation) over extended periods, typically one to several hours, at elevated temperature, to exhibit useful adsorptive capacity.

The gases discharged from the fluidized bed through duct 26 pass through a wet scrubber 28, (or other dry collector) where the fine carbon particles carried along in the gas stream are separated out. The separated carbon particles are relatively pure active carbon, typically having (B.E.T.) surface area of 300 square meters per gram or more. The carbon slurry from scrubber 28 is recycled to the sewage system and introduced therein, to adsorb impurities from the sewage and to markedly improve the quality of primary effluent. The activated carbon can be introduced downstream of tank 10, as shown, or can alternatively be introduced upstream of, or directly into tank 10, and still be effective.

An overflow line 34 is used for continuously removing the heavier char solids that have not gone into dispersed phase above it, from the fluidizing bed 22. These solids are not recycled to the primary system because they would cause an undue ash buildup in it. Nevertheless, this high ash char has some useful adsorbent capacity, typically 100 square meters per gram. It may therefore be employed to finish primary effluent, or as an aid in secondary or tertiary treatment, in various manners readily apparent to those skilled in the art of treating sewage and other waste water. Particularly where lime has been a primary additive, this high ash active char has useful capacity for chemisorbing phosphates by what appears to be an ion-exchange mechanism. As shown in the drawing, the char is introduced into the secondary treatment tank 14. This char is allowed to settle out of tank 14, and is then disposed of. It is not conveyed to the fluidized bed for recycling, because of its high ash content, as mentioned above.

From the above, it can be seen that through the use of a fluidized bed, a separation of the fines from the heavier char and ash particles is accomplished. The fine active carbon particles, with a density of 0.3 – 0.6 grams/cubic centimeter, are entrained in the gases flowing through the reactor 22, whereas the char and ash particles, which are of higher density, are removed through overflow line 34.

The amount of fines entrained in the gases leaving reactor 22 will vary, depending on the original makeup of the sewage. Typically, the fines might comprise 10–35 percent of the dry sludge on an ash-free basis. For example, if a yield from a sludge is 25 percent on the above basis and the sludge assays 30 percent ash, actual yield of gas entrained fines is 0.25(1.00 – 0.30) or 17.5 percent of the gross dry sludge. The above applies only to new, first cycle carbon being made from sludge. Also, it should be noted that although the majority of the air borne fines are active carbon, there will be some percentage, typically 10–25 percent, ash content. The ash-forming ingredients contribute to adsorptive capacity and, to some extent, constitute a portion of all commercial carbons, the percentage previously mentioned being applicable.

The effluent from subsequent treatment tank 14 is next subjected to chlorine treatment in chlorination tank 40, prior to its being discharged from the sewage treatment plant. For the initial start up of the fluidized bed, fluid coker petroleum coke or coal coke breeze may be used as a bed material. After desired bed temperature and dense phase fluidization are established, sludge cake may be fed to the bed. The rate of gas flow, and the rate of sludge feed should thereafter be adjusted to obtain the optimum yield of powdered active carbon. These rates will vary, depending on the moisture and the fixed carbon content of the sludge cake being fed to the fluidized bed, as well as on other factors.

It should be noted that the adsorbent capacity of the powdered active carbon increases with recycling. While powdered active carbon loss may amount to 5–30 percent per cycle, there will be a net gain of active carbon in the primary system with every cycle, until the active carbon loading in the primary system exceeds sludge filtration capacity. Thus primary effluent of high quality can be achieved. The abovementioned system can be utilized on any municipal or other sewage system. It will also have application for any waste water cleanup operation, so long as the waste water contains combustibles therein.

What is claimed is:

1. A method of treating sewage including the steps of subjecting the sewage to primary treatment which includes allowing solids to settle out in a settling tank, conveying the solids to a furnace, subjecting the solids to pyrolitic treatment in the furnace at temperatures within the range of 500°C–1000°C by passing a stream of hot gases therethrough, to form active carbon and char, separating the active carbon from the char by entraining it in the gases leaving the furnace, separating the active carbon from the gases, and introducing the active carbon into the settling tank to act as an adsorbent.

2. The method set forth in claim 1, wherein the solids are subjected to pyrolitic treatment in an atmosphere which contains free oxygen in an amount between 0.1–2 percent by volume.

3. The method set forth in claim 1, including the additional steps of passing the effluent from the settling tank to a second tank, and introducing the char into the second tank to act as a supplementary adsorbent.

4. The method set forth in claim 1, including controlling the flow of gases such that the entrained particles leaving the furnace have a density of 0.3–0.6 grams per cubic centimeter.

* * * * *